(12) United States Patent
Weichholdt et al.

(10) Patent No.: US 7,717,779 B1
(45) Date of Patent: May 18, 2010

(54) COMBINE WITH A CONVEYOR SWITCHABLE BETWEEN SWATH DEPOSIT OPERATION AND CHOPPER OPERATION IN DIFFERENT DIRECTIONS OF ROTATION

(75) Inventors: Dirk Weichholdt, Woelfling les Sarreguemines (FR); Rico Priesnitz, Blies-Ebersing (FR); Friedrich K Lauer, Krähenberg (DE); Oliver Klein, Saarlouis (DE); Chad Allen Dow, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/547,630

(22) Filed: Aug. 26, 2009

(51) Int. Cl.
*A01F 12/40* (2006.01)
(52) U.S. Cl. .................................. 460/112
(58) Field of Classification Search ............. 460/112, 460/111, 85; 56/500, 14.6; 241/186.3, 101.71, 241/49
See application file for complete search history.

(56) References Cited

U.S. PATENT DOCUMENTS

| | | | | |
|---|---|---|---|---|
| 3,670,739 | A * | 6/1972 | Rowland-Hill | 460/66 |
| 4,056,107 | A * | 11/1977 | Todd et al. | 460/112 |
| 4,628,946 | A * | 12/1986 | De Busscher et al. | 460/78 |
| 4,646,757 | A * | 3/1987 | Schmitt et al. | 460/112 |
| 4,884,993 | A * | 12/1989 | Hemker et al. | 460/14 |
| 5,021,028 | A * | 6/1991 | Kersting et al. | 460/85 |
| 5,833,533 | A * | 11/1998 | Roberg | 460/112 |
| 6,547,169 | B1* | 4/2003 | Matousek et al. | 239/661 |
| 6,860,805 | B2* | 3/2005 | Kuhn et al. | 460/111 |
| 6,863,605 | B2* | 3/2005 | Gryspeerdt et al. | 460/111 |
| 6,866,580 | B2* | 3/2005 | Weichholdt et al. | 460/112 |
| 7,063,613 | B2* | 6/2006 | Weichholdt | 460/112 |
| 7,066,810 | B2* | 6/2006 | Farley et al. | 460/112 |
| 7,074,126 | B2* | 7/2006 | Weichholdt et al. | 460/112 |
| 7,186,179 | B1* | 3/2007 | Anderson et al. | 460/111 |
| 7,381,130 | B2* | 6/2008 | Smith | 460/6 |
| 7,455,584 | B2* | 11/2008 | Farley et al. | 460/111 |
| 2003/0114207 | A1* | 6/2003 | Wolters et al. | 460/111 |
| 2004/0029624 | A1* | 2/2004 | Weichholdt | 460/112 |
| 2004/0204210 | A1* | 10/2004 | Weichholdt et al. | 460/112 |
| 2009/0042625 | A1* | 2/2009 | Dow et al. | 460/112 |

FOREIGN PATENT DOCUMENTS

DE 3644900 A1 * 10/1987
EP 212269 A * 3/1987

* cited by examiner

*Primary Examiner*—Árpád Fábián-Kovács

(57) ABSTRACT

The invention concerns a combine (10) with a chassis (12) that can be moved across a field in the forward operating direction, a harvested crop processing arrangement (26) with an outlet (62) for straw and a straw chopper (60) with an inlet for straw (58). A rotating conveyor drum (68) is attached downstream of the outlet (62) of the harvested crop processing arrangement (26) and upstream of the inlet (58) of the straw chopper (60) that rotates in a first direction of rotation in the swath deposit operating mode and that conveys the straw received from the harvested crop processing arrangement (26) past the straw chopper (60) to the ground, and conveys it in the chopper operating mode in the second direction of rotation into the inlet (58) of the straw chopper (60).

9 Claims, 1 Drawing Sheet

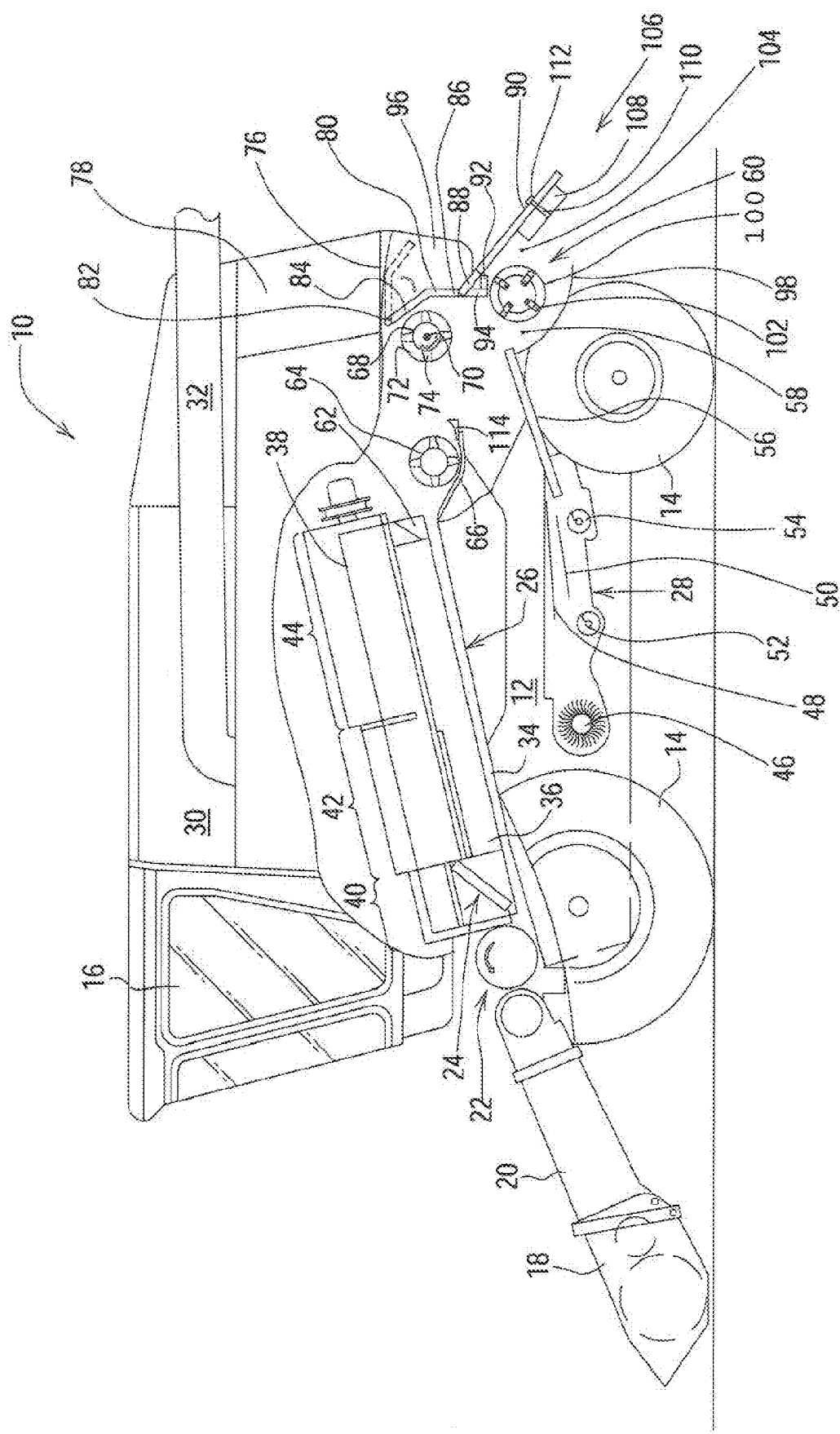

COMBINE WITH A CONVEYOR SWITCHABLE BETWEEN SWATH DEPOSIT OPERATION AND CHOPPER OPERATION IN DIFFERENT DIRECTIONS OF ROTATION

FIELD OF THE INVENTION

The invention concerns a combine with a chassis that can be moved in the forward direction across a field, a harvested crop process arrangement with an outlet for straw, a straw chopper with an inlet, and a conveyor arranged downstream of the outlet of the harvested crop process arrangement and upstream of the inlet of the straw chopper that can be driven for a swath deposit operation in a first direction of rotation and for the chopper operation in a second direction of rotation opposite to the direction of rotation of the first operation.

BACKGROUND OF THE INVENTION

Agricultural combines are large machines that harvest, thresh, separate, and clean agriculturally planted crop carrying corn. The clean corn attained in this way is stored in a corn tank arranged on the combine. The threshed-out straw is usually either chopped and distributed on the field across the width of the cutter head or conducted around the straw chopper and deposited in a swath on the field without being chopped in order to be able to retrieve it later by means of a baler. The harvested crop remains that remain at the rear outlet of the cleaning arrangement such as chaff and small straw particles are distributed across the field by a chaff spreader or conducted through the straw chopper and distributed across the field. The latter solution has the advantage that no separate chaff spreader is needed, but requires that the straw be conducted past the straw chopper to the rear in the swath deposit mode. Examples of such combines are described in DE 100 64 356 A and DE 102 56 744 A.

In DE 100 64 356 A sheet metal guide vane is arranged underneath the rear straw outlet of an axial separating arrangement, that is connected in joints at its lower end pivoted about a pivot axis to the frame of the combine and can be pivoted between a swath deposit position in which it extends at an angle upward and to the front and conducts the straw ejected by the axial separating arrangement to the ground at its rear side to the rear of the straw chopper, and a chopper position in which it extends approximately vertically and conducts the straw at its forward side into the straw chopper arranged underneath the pivot axis. Chaff and small straw particles are conducted in both operating modes by the suction effect of the straw chopper from the cleaning into the straw chopper.

DE 102 56 744 A proposes that a straw guide element be arranged that is connected in joints, pivoted about a pivot axis extending horizontally and transverse to the forward operating direction, underneath the axis of rotation of an ejection drum arranged under the outlet of an axial separating arrangement. Accordingly, the straw can be conducted into the straw chopper or conducted past its rear side onto the ground, in that the straw guide element is pivoted into the corresponding position. Chaff and small particles are conveyed by means of a conveyor sheet into the inlet of the straw chopper.

In the case of the two arrangements described the deflections of the harvested crop performed by pivoted guide elements that are otherwise rigid and stationary is seen as detrimental for conducting the straw to the straw chopper or for the deposit in a swath to the rear of the straw chopper, in that the attainable throughput is limited by the friction of the harvested crop on the guide elements. A further problem is seen in the fact that in view of capacity increases of more modern combines which lead to increasingly long cleaning arrangements the straw chopper must be arranged further to the rear which further complicates the conveying of the straw from a separating arrangement to the straw chopper either without a driven conveying arrangement (DE 100 64 356 A) or with only one conveying arrangement (DE 102 56 744 A).

DE 36 44 900 A describes another combine in which an adjustable straw guide surface is provided that can be pivoted between a swath deposit position and a straw chopper position and is located between the rear outlet of a straw shaker and the inlet to the straw chopper. The straw guide surface is connected in joints at its lower end to the frame of the combine and can be pivoted about a horizontal pivot axis extending transverse to the direction of operation between the swath deposit position, in which it extends at an angle upward and to the rear and guides the straw ejected from the straw shaker to the ground ahead of the straw shaker, and a straw chopper position, in which it extends at an angle upward and to the front and guides the straw into the straw chopper arranged to the rear of the pivot axis. In one embodiment the straw guide element is configured as a conveyor belt. In this arrangement the disadvantage is seen in the fact that a separate chaff distributor is required in order to distribute the chaff and small straw particles given off by the cleaning arrangements across the field, since the straw is deposited on the ground ahead of the straw chopper in the swath deposit mode.

U.S. Pat. No. 7,066,810 B is seen as forming a class and describes a further combine in which a conveyor belt operating in overshot mode is arranged that follows to the rear of the outlet of the axial separating arrangement with an ejection drum arranged downstream. At the rear end of the conveyor belt sheet metal guide surfaces are attached that form a duct directed downward in the chopper mode, and conduct the straw into a straw chopper arranged underneath and to the rear of the rear end of the conveyor belt that chops it and distributed it across the field. The harvested crop remains from the cleaning arrangement are distributed across the field. Furthermore, the sheet metal guide surfaces can be brought into a swath deposit position in which they guide the straw onto the field to the rear of the straw chopper. Furthermore, a position of the harvesting crop remains distribution arrangement is provided, in which the sheet metal guide surface forming the forward wall of the duct is pivoted at an angle to the rear, so that the chopped crop is moved downward ahead of the straw chopper and is deposited there on the ground mixed with the chaff from the chaff spreader. In place of the sheet metal guide surface, the conveyor belt can also be pivoted into an approximately vertical position about the axis of rotation of its front or its rear deflecting roll, in which it guides its straw onto the ground that was thrown by the ejection drum against its forward side. Here it can be seen as detrimental that several chaff distributors are necessary and that a multitude of moveable parts are required, in order attain the various modes of operation.

SUMMARY OF THE INVENTION

The purpose underlying the invention is seen in the need to prepare a combine of the kind cited initially in which a transportation of the straw, without any problems, can be performed in the swath deposit mode as well as in the chopper mode.

This problem is solved according to the invention by the teaching of patent claim 1, where the further patent claims cite characteristics that further develop the solution to great advantage.

A combine includes a chassis that can be moved across a field in the forward direction of operation and a harvested crop processing arrangement arranged within it that threshes and separates the harvested crop taken up by the front harvesting attachment. The threshed-out straw, generally separated from the corn, is ejected through an outlet of the harvested crop processing arrangement and transferred to a conveyor drum. The conveyor drum can be driven in two directions. In the swath deposit operating mode it is driven in the first direction of rotation and conveys the straw received from the ejection drum past the straw chopper onto the ground. In the chopper operating mode the conveyor drum is driven in the second direction of rotation, opposite to the first direction of rotation, and conveys the straw into the inlet of the straw chopper.

In this manner, by reversing the direction of rotation of the conveyor drum it is possible to achieve a switching without any problems between the chopper operation and the swath deposit operation. In both modes of operation the straw is actively conveyed by the conveyor drum so that a jam of the harvested crop need not be feared. A change in position of the conveyor drum between chopper operating mode and swath deposit mode is not required.

The direction of rotation of the conveyor drum is preferably selected in such a way that it conveys in an overshot manner in the first direction of rotation and in an undershot manner in the second direction of rotation. Thereby the result is that the straw is deposited on the ground in swath deposit mode to the rear of the straw chopper. An advantage of this condition is seen in the fact that it makes possible a cleaning system that conducts the harvested crop remains (chaff and small straw particles) to an inlet of the straw chopper both in the swath deposit mode and in the chopper mode. The conveying of the chaff from the cleaning arrangement to the straw chopper can be performed by an air flow or by means of a conveying sheet, or the outlet of the cleaning arrangement is directly adjoining to the inlet of the straw chopper.

In order to prevent the straw carried along by the conveyor drum in the chopper operating mode from being ejected through a rear ejection opening of the combine, the invention proposes that a pivoted flap be arranged to the rear of the conveyor that covers the outlet opening of the combine in the chopper operating mode and opens it in the swath deposit mode. The shape of the flap can conform to the shape of the conveyor drum.

To improve the delivery of the harvested crop an ejection drum may be associated with the harvested crop process arrangement. The ejection drum preferably accelerates the straw in such a way that it reaches the drum conveyor in free flight.

BRIEF DESCRIPTION OF THE DRAWINGS

An embodiment of the invention is explained in relation to the illustration described below.

FIG. 1 shows a partial section of a side view of a combine with a conveyor drum that can be operated in different directions in the swath deposit mode and in the chopper operating mode.

DETAILED DESCRIPTION OF THE PREFERRED EMBODIMENT

FIG. 1 shows an agricultural combine 10 with a chassis 12 with wheels 14 in contact with the ground that are fastened to the chassis 12, and are used for the forward propulsion of the combine 10, which travels to the left (in FIG. 1) as it harvests crop. The operation of the combine 10 is controlled from the operator's cab 16. A cutter head 18 is used to harvest harvested crop containing corn and to conduct it to a slope conveyor 20. The harvested crop is conducted by the slope conveyor 20 to a guide drum 22. The guide drum 22 guides the harvested crop through an inlet transition section 24 to an axial harvested crop processing arrangement 26. In the following directions such as front and rear refer to the forward operating direction of the combine 10.

The harvested crop processing arrangement 26 includes a rotor housing 34 and a rotor 36 arranged within it. The rotor 36 includes a hollow drum 38 to which crop processing elements are fastened for a charging section 40, a threshing section 42, and a separating section 44. The charging section 40 is arranged on the front side of the axial harvested crop process arrangement 26. The threshing section 42 and separating section 44 are located downstream in the longitudinal direction and to the rear of the charging section 40. The drum 38 is in the form of a truncated cone in the charging section 40. The threshing section 42 includes a forward section in the form of a truncated cone and a cylindrical rear section. The cylindrical separating section 44 of the drum 38 is located at the end of the axial harvested crop processing arrangement 26. In place of an axial harvested crop processing arrangement 26 a tangential threshing drum followed by an axial separating arrangement or a straw shaker could also be used.

Corn and chaff that fall through a threshing basket associated with the threshing section 42 and a separating grate associated with the separating section 44 are conducted to a cleaning system 28 which includes a blower 46, an upper sieve 48, and a lower sieve 50 that can be driven in generally fore-and-aft oscillating movement. The cleaning system 28 removes the chaff and conducts the clean corn by means of a screw conveyor 52 to an elevator for clean corn (not shown). The elevator for clean corn deposits the clean corn in a corn tank 30. The clean corn in the corn tank 30 can be unloaded by means of an unloading screw conveyor 32 to a corn wagon, trailer, or truck. Harvested crop remaining at the rear end of the lower sieve 50 is again conducted to the harvested crop processing arrangement 26 by means of a screw conveyor 54 and an overshot conveyor (not shown). The harvested crop remains that are carried to the rear end of the upper sieve 48, consist essentially of chaff and small straw particles, which are then conveyed rearwardly into the inlet 58 of a straw chopper 60 by means of an oscillating conveyor sheet 56.

Threshed out straw that leaves the separating section 44 is ejected through an outlet 62 from the harvested crop processing arrangement 26 and conducted to an ejection drum 64. The ejection drum 64 that interacts with a sheet 66 ejects the straw to the rear. A conveyor 68, preferably in the form of a drum conveyor, is located to the rear of the ejection drum 64 and approximately at the vertical height of the axis of rotation of the ejection drum 64. The conveyor 68 extends horizontally and transverse to the forward operating direction and can be brought into rotation in both possible directions of rotation about its axis of rotation 70 (in which it is fastened to the chassis 12, free to rotate, but otherwise in a fixed position) by means of an appropriate drive. Typically, a hydraulic motor is employed to drive the conveyor 68. The conveyor 68 is preferably constructed the same as the ejection drum 64 and includes a rotationally symmetrical sleeve 72 with drivers 74 distributed around its circumference and rigidly attached thereto, the leading and trailing edges of the drivers are preferably symmetrical.

An upper wall 76 is arranged above the ejection drum 64 and the conveyor 68. Upper wall 76 extends horizontally and in the forward operating direction. Upper wall 76 encloses an engine compartment 78 in the downward direction. A flap 80 is connected in joints, free to pivot about an axis 82 extending horizontally and transverse to the forward operating direction, it can be pivoted between a swath deposit position and a chopper position. Flap 80 is located on the wall 76 above the conveyor 68. Flap 80 in its chopper position (which it is shown in solid lines) has an upper section 84 that extends from the axis 82 at an angle to the rear and downward and has a lower section 86 adjacent to upper section 84 that extends generally vertically downward. Flap 80 conforms to the shape of the conveyor drum 68. Underneath the lower section 86, there follows without any gaps a sheet metal part 88 rigidly connected to the chassis, which extends at an angle to the rear and downward and is connected with a slide 90 and extending parallel to it, on which the straw can slide to the ground in the swath deposit operation. The straw swath can also be brought into a desired shape by a guide runner or a straw guide rake (not shown) attached on the upper side of the slide 90. A horizontal sheet metal part 92 and a vertical sheet metal part 94 are attached ahead of the sheet metal part 88, that form a triangular profile with the sheet metal part 88 and form an upper front cover defining the inlet 58 of the straw chopper 60.

The flap 80 can be pivoted about the axis 82 between the chopper position, in which it is shown in solid lines in the FIGURE, and a swath deposit position, in which the flap 80 is shown in the FIGURE in dashed lines and that frees a rear outlet opening 96 of the combine 10.

The straw chopper 60 is located underneath the sheet metal parts 88, 92, 94, it is composed of a housing 98 and a rotor 100 arranged within it that can rotate about a horizontal axis extending transverse to the direction of operation and includes chopper knives 102, pendulously suspended, distributed around the circumference of the rotor 100. The slide 90 forms an upper housing for the straw chopper 60. Two blowers 106 are arranged to the side alongside each other underneath the slide 90. The two blowers 106 are provided downstream of an outlet 104 of the straw chopper 60, of which only one is visible in FIG. 1. The blowers 106 include a number of air moving blades 108 that are connected to the shaft 110 extending orthogonally to the slide 90. The shaft 110 can be brought into rotation in each case by means of a hydraulic motor 112. In the swath deposit position the straw chopper 60 conveys only the harvested crop remains from the cleaning system 28 to the blowers 106 that distribute them onto the ground approximately across the width of the cutter heads 18. In place of the blowers 106 a number of straw guide plates arranged side by side alongside each other, rigid or vibrating could be used. Moreover the straw chopper 60 could also be provided with an upper housing independent of the slide 90, to which the blowers 106 could also be attached.

For the deposit of the straw in a swath, the flap 80 can be brought into the swath deposit position (shown in dashed lines) manually by an appropriate lever from the operator or by means of a drive actuated by external force (not shown) from the operator's cab 16. The straw is conducted from the outlet 62 of the harvested crop processing arrangement 26 to the ejection drum 64 that throws it in free flight to the conveyor 68. The sideways distribution of the straw can be optimized by preferably adjustable guide track 114 arranged downstream of the ejection drum 68. The conveyor 68 is driven in the overshot manner in the swath deposit operating mode; accordingly it rotates in the clockwise direction as seen in FIG. 1. Thereby the straw is conveyed by the conveyor 68, through the ejection opening 96 and onto the slide 90 from which it slides onto ground.

In the chopper position the flap 80 is pivoted downward about the axis 82 opposite to the swath deposit position as is shown in FIG. 1. The straw conveyed in undershot mode by the conveyor 68 is now driven opposite to the direction of the swath deposit operating mode, in counter clockwise direction in FIG. 1, it is accelerated downward by the conveyor 68 and falls downward into the inlet 58 of the straw chopper 60 which chops it together with the harvested crop remains from the cleaning system 28 and distributes it across the ground by means of the blowers 106.

The invention claimed is:

1. A combine (10) comprising:
    a chassis (12) that can be moved in a forward operating direction across a field;
    a harvested crop processing arrangement (26) with an outlet (62) for straw,
    a straw chopper (60) with an inlet (58); and
    a conveyor (68) arranged downstream of the outlet (62) of the harvested crop processing arrangement (26) and arranged upstream of the inlet (58) of the straw chopper (60);
    wherein the conveyor (68) is configured to be driven in a first direction in a swath deposit mode of operation and is configured to be driven in a second direction opposite to the first direction in a chopper mode of operation;
    wherein the conveyor (68) is a rotating drum conveyor and is configured to convey the straw it receives from the outlet (62) of the harvested crop processing arrangement (26) past the straw chopper (60) and to the ground in the first direction of rotation, and is configured to convey the straw it receives from the outlet (62) of the harvested crop processing arrangement (26) into the inlet (58) of the straw chopper (60) in the second direction of rotation;
    wherein the conveyor (68) operates in an overshot mode in the first direction of rotation and operates in an undershot mode in the second direction of rotation;
    the combine further comprising a pivoted flap (80) that is attached to the rear of the conveyor (68), wherein the pivoted flap (80) covers an ejection outlet (96) of the combine (10) at the rear of the chopper in the chopper mode and opens the outlet (96) in the swath deposit mode.

2. The combine (10) according to claim 1, further comprising an ejection drum (64) associated with the outlet (62) of the harvested crop processing arrangement (26), wherein the ejection drum (64) is disposed to conduct the straw to the conveyor drum (68).

3. The combine (10) according to claim 2, wherein the conveyor (68) is positioned at the height of the ejection drum (64).

4. The combine (10) according to claim 2, wherein the ejection drum (64) is configured to convey the straw in free flight to the conveyor (68).

5. The combine (10) according to claim 1, further comprising a cleaning system (28) configured to conduct the harvested crop remains to the inlet (58) of the straw chopper (60) in both the swath deposit mode and the chopper mode.

6. The combine (10) according to claim 3, wherein the ejection drum (64) is configured to convey the straw in free flight to the conveyor (68).

7. The combine (10) according to claim 2, further comprising a cleaning system (28) configured to conduct the harvested crop remains to the inlet (58) of the straw chopper (60) in both the swath deposit mode and the chopper mode.

8. The combine (10) according to claim 3, further comprising a cleaning system (28) configured to conduct the harvested crop remains to the inlet (58) of the straw chopper (60) in both the swath deposit mode and the chopper mode.

9. The combine (10) according to claim 4, further comprising a cleaning system (28) configured to conduct the harvested crop remains to the inlet (58) of the straw chopper (60) in both the swath deposit mode and the chopper mode.

* * * * *